United States Patent
Bisaiji et al.

(10) Patent No.: US 9,845,756 B2
(45) Date of Patent: Dec. 19, 2017

(54) EXHAUST GAS CONTROL APPARATUS FOR INTERNAL COMBUSTION ENGINE

(75) Inventors: Yuki Bisaiji, Mishima (JP); Kohei Yoshida, Gotemba (JP); Kenji Sakurai, Susono (JP); Kohki Nakamura, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 103 days.

(21) Appl. No.: 14/416,709

(22) PCT Filed: Jul. 27, 2012

(86) PCT No.: PCT/JP2012/069218
§ 371 (c)(1),
(2), (4) Date: Feb. 27, 2015

(87) PCT Pub. No.: WO2014/016965
PCT Pub. Date: Jan. 30, 2014

(65) Prior Publication Data
US 2015/0176514 A1   Jun. 25, 2015

(51) Int. Cl.
*F01N 3/00*     (2006.01)
*F02D 41/14*    (2006.01)
(Continued)

(52) U.S. Cl.
CPC ....... *F02D 41/1461* (2013.01); *F01N 3/0814* (2013.01); *F01N 3/206* (2013.01);
(Continued)

(58) Field of Classification Search
CPC .................................................. F02D 41/0275
See application file for complete search history.

(56) References Cited

U.S. PATENT DOCUMENTS 6,499,293 B1 * 12/2002 Surnilla ................ F01N 3/0814
60/274
2001/0015066 A1   8/2001 Takaku et al.
(Continued)

FOREIGN PATENT DOCUMENTS

EP    1001154 A2    5/2000
EP    1229231 A2    8/2002
(Continued)

*Primary Examiner* — Patrick Maines
*Assistant Examiner* — Jason Sheppard
(74) *Attorney, Agent, or Firm* — Andrews Kurth Kenyon LLP

(57) ABSTRACT

A three-way catalyst and an $NO_x$ adsorption catalyst are disposed in an engine exhaust passage. In a predetermined low-load engine operation area, combustion in a combustion chamber is carried out at a lean base air-fuel ratio and an air-fuel ratio in the combustion chamber is changed to a rich range at the time of discharging $NO_x$ from the $NO_x$ adsorption catalyst. In a predetermined high-load engine operation area, the air-fuel ratio in the combustion chamber is controlled to a theoretical air-fuel ratio in a feedback manner. In a predetermined middle-load engine operation area, the combustion in the combustion chamber is carried out at the base air-fuel ratio lower than the base air-fuel ratio in the low-load engine operation area and the air-fuel ratio in the combustion chamber is changed to the rich range with a period shorter than a rich period of the air-fuel ratio for discharging $NO_x$ in the low-load engine operation area.

12 Claims, 13 Drawing Sheets

(51) Int. Cl.
*F02D 41/02* (2006.01)
*F01N 13/00* (2010.01)
*F01N 3/20* (2006.01)
*F01N 3/08* (2006.01)
*F01N 3/10* (2006.01)
*F02M 26/15* (2016.01)

(52) U.S. Cl.
CPC ....... *F01N 13/009* (2014.06); *F02D 41/0275* (2013.01); *F02D 41/1475* (2013.01); *F01N 3/0842* (2013.01); *F01N 3/101* (2013.01); *F01N 2900/1614* (2013.01); *F02D 2250/36* (2013.01); *F02M 26/15* (2016.02); *Y02T 10/22* (2013.01)

(56) References Cited

U.S. PATENT DOCUMENTS

| | | | |
|---|---|---|---|
| 2002/0053200 A1* | 5/2002 | Ohuchi | F01N 3/0842 60/285 |
| 2003/0126859 A1 | 7/2003 | Wachi et al. | |
| 2004/0025499 A1 | 2/2004 | Nakatani et al. | |
| 2004/0050037 A1* | 3/2004 | Betta | B01D 53/9431 60/286 |
| 2004/0182069 A1 | 9/2004 | Goralski, Jr. et al. | |
| 2006/0053778 A1* | 3/2006 | Asanuma | F01N 3/0814 60/295 |
| 2011/0209462 A1 | 9/2011 | Asanuma et al. | |
| 2012/0131908 A1 | 5/2012 | Bisaiji et al. | |
| 2012/0222406 A1 | 9/2012 | Sakurai et al. | |

FOREIGN PATENT DOCUMENTS

| | | |
|---|---|---|
| EP | 2402572 A1 | 1/2012 |
| JP | 2002188429 A | 7/2002 |
| JP | 2008-038890 A | 2/2008 |
| JP | 2008-163775 A | 7/2008 |
| JP | 4893876 B2 | 3/2012 |
| WO | 2011/061820 A1 | 5/2011 |
| WO | 2014/024311 A1 | 2/2014 |

* cited by examiner

FIG. 1
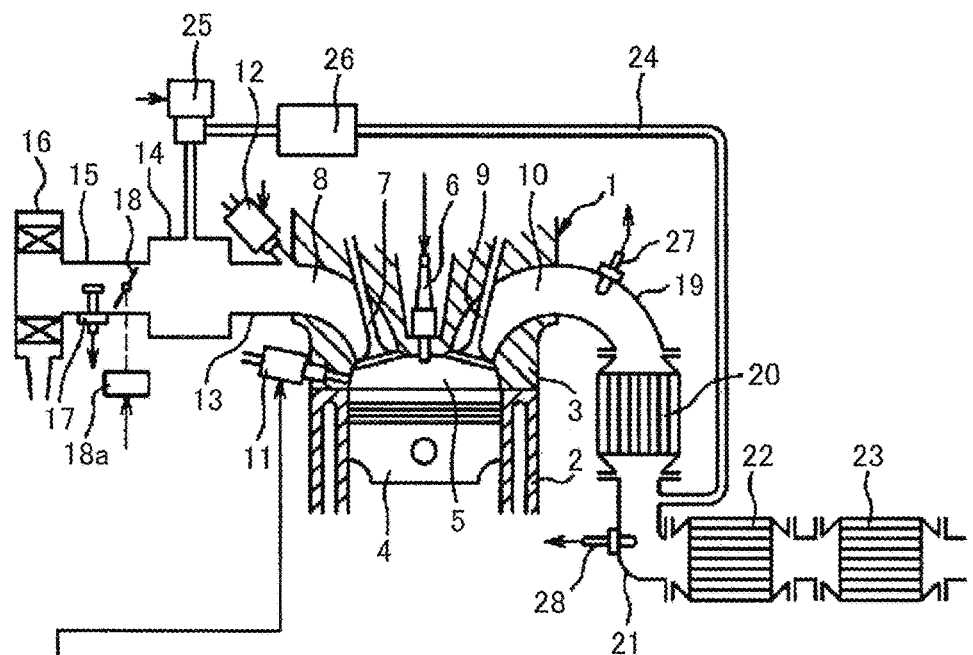
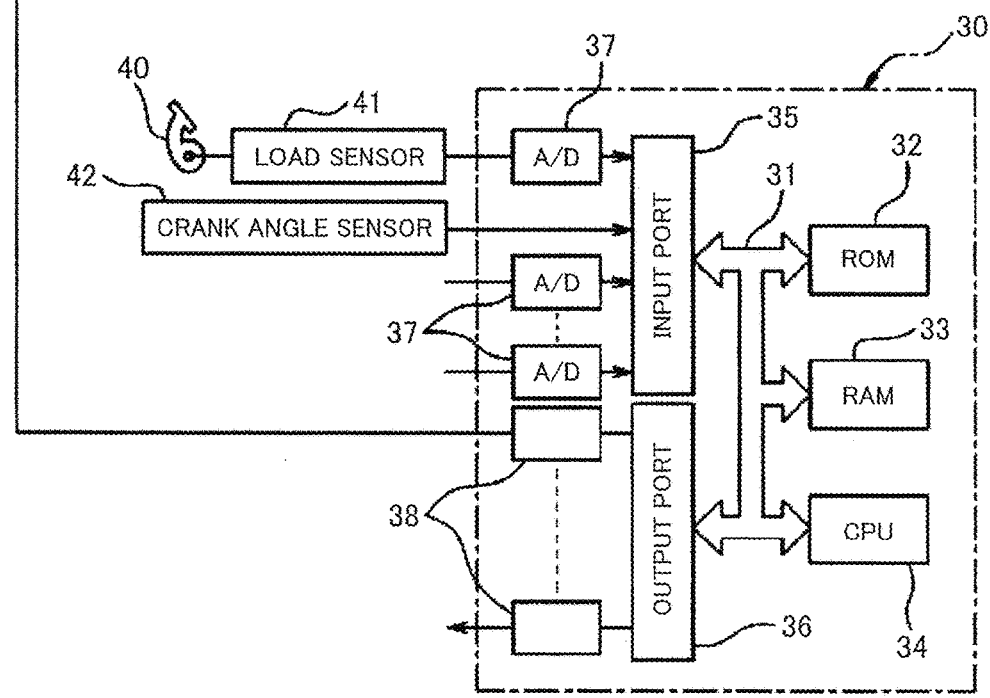

F I G . 7
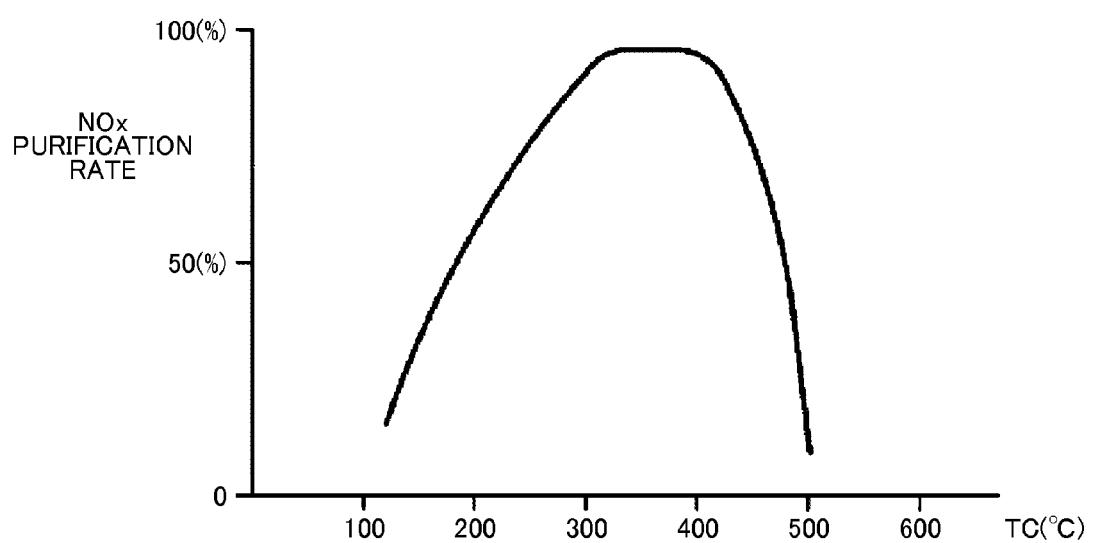

EXHAUST GAS CONTROL APPARATUS FOR INTERNAL COMBUSTION ENGINE

CROSS-REFERENCE TO RELATED APPLICATION

This is a national phase application based on the PCT International Patent Application No. PCT/JP2012/069218 filed Jul. 27, 2012, the entire contents of which are incorporated herein by reference.

TECHNICAL FIELD

The present invention relates to an exhaust gas control apparatus for an internal combustion engine.

BACKGROUND ART

An internal combustion engine is known in which a three-way catalyst is disposed in an engine exhaust passage, an $NO_x$ adsorption catalyst adsorbing $NO_x$ in exhaust gas when an air-fuel ratio of the introduced exhaust gas is in a lean range and discharging the adsorbed $NO_x$ when the air-fuel ratio of the introduced exhaust gas is in a rich range is disposed in the engine exhaust passage downstream of the three-way catalyst, and an engine operation mode is switched to either a lean air-fuel ratio operation mode in which combustion is carried out at a lean air-fuel ratio or a theoretical air-fuel ratio operation mode in which combustion is carried out at a theoretical air-fuel ratio depending on engine operation states (for example, see Patent Literature 1).

In such an internal combustion engine, the amount of fuel consumed when the combustion is carried out at the lean air-fuel ratio is less than that when the combustion is carried out at the theoretical air-fuel ratio. Accordingly, in the internal combustion engine, the combustion is generally carried out at the lean air-fuel ratio in an operation area that is as wide as possible. However, when the combustion is carried out at the lean air-fuel ratio in a state in which an engine load is high, the temperature of the $NO_x$ adsorption catalyst rises and thus $NO_x$ adsorption capability of the $NO_x$ adsorption catalyst decreases, whereby an $NO_x$ purification rate decreases. Accordingly, in the internal combustion engine, the operation mode is switched from the lean air-fuel ratio operation mode to the theoretical air-fuel operation mode when the engine load becomes high so as not to decrease the $NO_x$ purification rate.

CITATION LIST

Patent Literature

Patent Literature 1: Japanese Patent Application Publication No. 2008-38890 (JP 2008-38890 A)

SUMMARY OF THE INVENTION

Technical Problem

However, when the operation mode is switched to the theoretical air-fuel ratio operation mode in this way and the combustion is carried out at the theoretical air-fuel ratio, there is a problem in that the amount of fuel consumed increases.

An object of the invention is to provide an exhaust gas control apparatus for an internal combustion engine that can secure a high $NO_x$ purification rate and reduce the amount of fuel consumed.

Solution to Problem

According to the invention, there is provided an exhaust gas control apparatus for an internal combustion engine in which a three-way catalyst and an $NO_x$ adsorption catalyst adsorbing $NO_x$ in exhaust gas when an air-fuel ratio of introduced exhaust gas is in a lean range and discharging the adsorbed $NO_x$ when the air-fuel ratio of the introduced exhaust gas is changed to a rich range are disposed in an engine exhaust passage, wherein an operation area of an engine includes a predetermined low-load engine operation area on a low-load engine operation side, a predetermined high-load engine operation area on a high-load engine operation side, and a predetermined middle-load engine operation area is set between the low-load engine operation area and the high-load engine operation area, wherein in the predetermined low-load engine operation area, combustion in a combustion chamber is carried out at a lean base air-fuel ratio and the air-fuel ratio in the combustion chamber is changed to the rich range at the time of discharging $NO_x$ from the $NO_x$ adsorption catalyst, wherein in the predetermined high-load engine operation area, the air-fuel ratio in the combustion chamber is controlled to a theoretical air-fuel ratio in a feedback manner, and wherein in the predetermined middle-load engine operation area, the combustion in the combustion chamber is carried out at the base air-fuel ratio lower than the base air-fuel ratio in the low-load engine operation area and the air-fuel ratio in the combustion chamber is changed to the rich range with a period shorter than a rich period of the air-fuel ratio for discharging $NO_x$ in the low-load engine operation area.

Effects of the Invention

It is possible to secure a high $NO_x$ purification rate and to reduce the amount of fuel consumed by providing a middle-load engine operation area in which $NO_x$ can be purified and combustion can be carried out at a lean air-fuel ratio.

BRIEF DESCRIPTION OF THE DRAWINGS

FIG. 1 is a diagram illustrating the entire configuration of an internal combustion engine.

FIG. 7 is a diagram illustrating an $NO_x$ purification rate.

MODES FOR CARRYING OUT THE INVENTION

Figure 2:
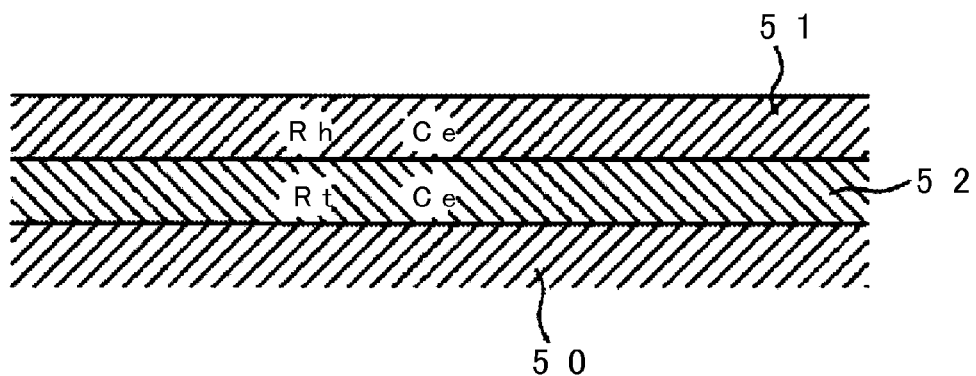
FIG. 2 is a diagram schematically illustrating a surface part of a substrate of a three-way catalyst.

FIG. 1 is a diagram illustrating the entire configuration of a spark-ignited internal combustion engine.

Referring to FIG. 1, reference numeral 1 denotes an engine body, reference numeral 2 denotes a cylinder block, reference numeral 3 denotes a cylinder head, reference numeral 4 denotes a piston, reference numeral 5 denotes a combustion engine, reference numeral 6 denotes an ignition plug, reference numeral 7 denotes an intake valve, reference numeral 8 denotes an intake port, reference numeral 9 denotes an exhaust valve, and reference numeral 10 denotes an exhaust port. As illustrated in FIG. 1, each cylinder includes a pair of fuel injection valves of an electronically-controlled fuel injection valve 11 injecting fuel into the combustion chamber 2 and an electronically-controlled fuel injection valve 12 injecting fuel into the intake port 8. The intake port 8 of each cylinder is connected to a surge tank 14 via an intake branch pipe 13, and the surge tank 14 is connected to an air cleaner 16 via an intake duct 15. An intake air detector 17 and a throttle valve 18 that is driven by an actuator 18a are disposed in the intake duct 15.

On the other hand, the exhaust port 10 of each cylinder is connected to an inlet of a three-way catalyst 20 via an exhaust manifold 19, and an outlet of the three-way catalyst 20 is connected to an inlet of an $NO_x$ adsorption catalyst 22 via an exhaust pipe 21. An outlet of the $NO_x$ adsorption catalyst 22 is connected to an $NO_x$ selective-reduction catalyst 23. On the other hand, the exhaust pipe 21 and the surge tank 14 are connected to each other via an exhaust gas recirculation (hereinafter, referred to as EGR) passage 24. An electronically-controlled EGR control valve 25 is disposed in the EGR passage 24, and a cooling device 26 that cools exhaust gas flowing in the EGR passage 24 is disposed around the EGR passage 24. In the embodiment illustrated in FIG. 1, an engine coolant is guided into the cooling device 26 and exhaust gas is cooled by the engine coolant.

An electronic control unit 30 is constituted by a digital computer and includes a read only memory (ROM) 32, a random access memory (RAM) 33, a CPU (microprocessor) 34, an input port 35, and an output port 36, which are connected to each other via a bidirectional bus 31. An air-fuel ratio sensor 27 detecting the air-fuel ratio of exhaust gas discharged from the engine is disposed on the upstream side of the three-way catalyst 20, and an oxygen concentration sensor 28 detecting an oxygen concentration in the exhaust gas is disposed on the downstream side of the three-way catalyst 20. Output signals of the air-fuel ratio sensor 27, the oxygen concentration sensor 28, and an intake air detector 17 are input to the input port 35 via corresponding AD converters 37, respectively. A load sensor 41 generating an output voltage proportional to a pressure L applied to an accelerator pedal 40 is connected to the accelerator pedal 40, and the output voltage of the load sensor 41 is input to the input port 35 via the corresponding AD converter 37. A crank angle sensor 42 generating an output pulse whenever a crank shaft rotates, for example, by 30° is connected to the input port 35. On the other hand, the output port 36 is connected to the ignition plug 6, the fuel injection valves 11, 12, the throttle valve driving actuator 18a, and the EGR control valve 25 via the corresponding drive circuit 38.

FIG. 2 is a diagram schematically illustrating a surface part of a substrate 50 of the three-way catalyst 20. As illustrated in FIG. 2, an upper coating layer 51 and a lower coating layer 52 are stacked on a catalyst carrier 50. The upper coating layer 51 is formed of rhodium Rh and cerium Ce, and the lower coating layer 52 is formed of platinum Pt and cerium Ce. In this case, the amount of cerium Ce included in the upper coating layer 51 is less than the amount of cerium Ce included in the lower coating layer 52. The upper coating layer 51 may include zirconia Zr and the lower coating layer 52 may include palladium Pd.

The three-way catalyst 20 has a function of simultaneously reducing harmful components HC, CO, and $NO_x$ included in exhaust gas when combustion in the combustion chamber 5 is carried out at a theoretical air-fuel ratio, that is, when the air-fuel ratio of the exhaust gas discharged from the engine is a theoretical air-fuel ratio. Accordingly, when combustion in the combustion chamber 5 is carried out at the theoretical air-fuel ratio, the harmful components HC, CO, and $NO_x$ included in the exhaust gas are purified by the three-way catalyst 20.

Maintaining of the air-fuel ratio in the combustion chamber 5 at the exact theoretical air-fuel ratio is not possible. Accordingly, actually, the amount of fuel injected from the fuel injection valves 11, 12 is controlled on the basis of the detection signal of the air-fuel ratio sensor 27 in a feedback manner such that the air-fuel ratio of the exhaust gas discharged from the combustion chamber 5 is almost equal to the theoretical air-fuel ratio, that is, such that the air-fuel ratio of the exhaust gas discharged from the combustion chamber 5 varies with the theoretical air-fuel ratio as the median. In this case, when the center of the variation of the air-fuel ratio of the exhaust gas departs from the theoretical air-fuel ratio, the center of the variation of the air-fuel ratio of the exhaust gas is adjusted so as to return to the theoretical air-fuel ratio on the basis of the output signal of the oxygen concentration sensor 28. In this way, even when the air-fuel ratio of the exhaust gas discharged from the combustion chamber 5 varies with respect to the theoretical air-fuel ratio, the harmful components HC, CO, and $NO_x$ included in exhaust gas are purified well by the three-way catalyst 20 due to the oxygen storage capability of the three-way catalyst 20 based on cerium Ce.

Figure 3A:
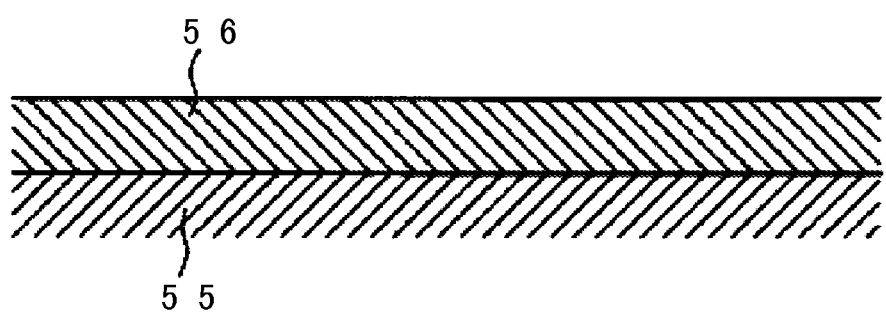
FIGS. 3A and 3B are diagrams schematically illustrating a surface part and the like of a catalyst carrier of an $NO_x$ adsorption catalyst.
Figure 3B:
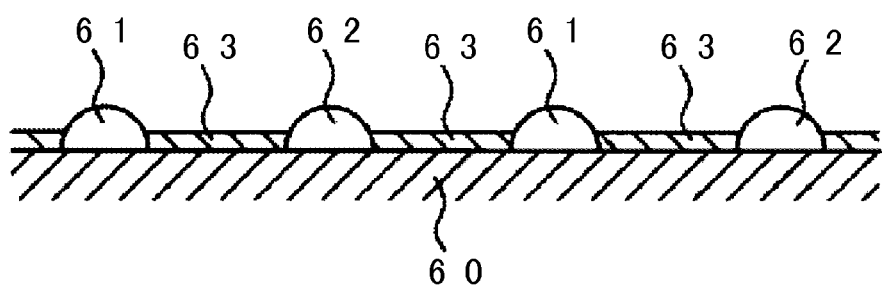

FIG. 3A schematically illustrates a surface part of a substrate 55 of the $NO_x$ adsorption catalyst 22. As illustrated in FIG. 3A, a coating layer 56 is formed on the substrate 55 of the $NO_x$ adsorption catalyst 22. The coating layer 56 is formed of, for example, an aggregate of powder, and FIG. 3B illustrates an enlarged view of the powder. Referring to FIG. 3B, precious metal catalysts 61, 62 are supported on a catalyst carrier 60, which is formed of, for example, alumina, of the powder and a basic layer 63 including at least one selected from alkali metal such as potassium K, sodium Na, and cesium Cs, alkali-earth metal such as barium Ba and calcium Ca, rare-earth metal such as lanthanoid, and metal, which can donate electrons to $NO_x$, such as silver Ag, copper Cu, iron Fe, and iridium Ir is formed on the catalyst carrier 60.

On the other hand, in FIG. 3B, the precious metal catalyst 61 is formed of platinum Pt, and the precious metal catalyst 62 is formed of rhodium Rh. In this case, any of the precious metal catalyst 61, 62 can be formed of platinum Pt. Palladium Pd in addition to platinum Pt and rhodium Rh can be supported on the catalyst carrier 60 or palladium Pd can be supported instead of rhodium Rh. That is, the precious metal catalysts 61, 62 supported on the catalyst carrier 60 are formed of at least one of platinum Pt, rhodium Rh, and palladium Pd.

Figure 4A:
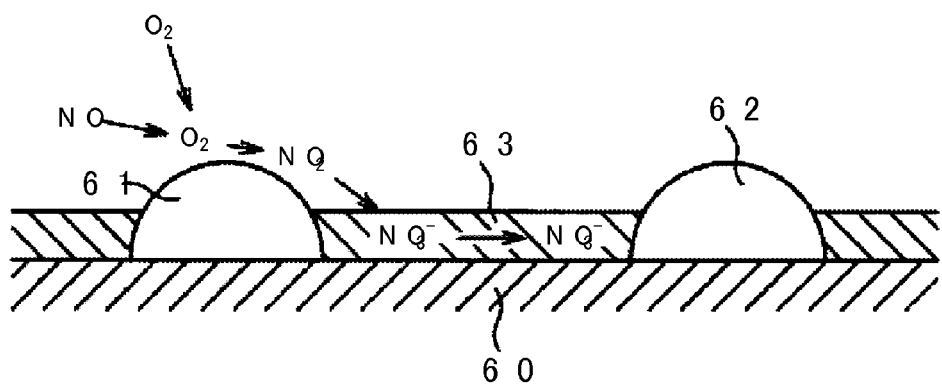
FIGS. 4A and 4B are diagrams illustrating an oxidation-reduction reaction in the $NO_x$ adsorption catalyst.
Figure 4B:
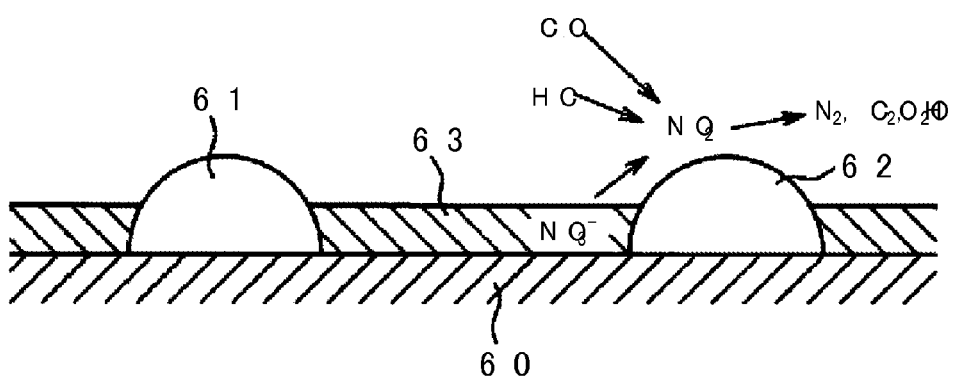

An $NO_x$ adsorbing and discharging operation of the $NO_x$ adsorption catalyst 22 will be described below with reference to FIGS. 4A and 4B showing an enlarged view of FIG. 3B.

When combustion is carried out at a lean air-fuel ratio, that is, when the air-fuel ratio of the exhaust gas is in a lean range, the oxygen concentration in the exhaust gas is high. Accordingly, NO included in the exhaust gas at this time is oxidized into $NO_2$ by platinum Pt 61 as illustrated in FIG. 4A, is adsorbed in the basic layer 63, is diffused in the form of $NO_3^-$ in the basic layer 63, and becomes nitrate. In this way, $NO_x$ in the exhaust gas is adsorbed in the form of nitrate in the basic layer 63. $NO_2$ is produced on the surface of platinum Pt 61 as long as the oxygen concentration in the exhaust gas is high, and $NO_x$ is adsorbed in the basic layer 63 and nitrate is produced as long as the $NO_x$ absorption capability of the basic layer 63 is not saturated.

On the other hand, when the air-fuel ratio in the combustion chamber 5 is changed to a rich range, the oxygen concentration in the exhaust gas flowing into the $NO_x$ adsorption catalyst 22 is lowered. Accordingly, the reverse reaction occurs ($NO_3^- \rightarrow NO_2$), and nitrate adsorbed in the basic layer 63 sequentially becomes nitrate ions $NO_3^-$ which are discharged in the form of $NO_2$ from the basic layer 63 as illustrated in FIG. 4B. Subsequently, discharged $NO_2$ is reduced by hydrocarbon HC and CO included in the exhaust gas.

When combustion is carried out at a lean air-fuel ratio, that is, when the air-fuel ratio of the exhaust gas is in a lean range, NO is adsorbed on the surface of the Platinum Pt 61 and thus NO in the exhaust gas is maintained by the $NO_x$ adsorption catalyst 22 through the adsorption operation. NO adsorbed on the surface of the platinum Pt 61 can be detached from the surface of the platinum Pt 61, when the air-fuel ratio in the combustion chamber 5 is changed to a rich range. Accordingly, when the term, adsorption, is used as a term including both the absorption and the adsorption, the basic layer 63 serves as an $NO_x$ adsorbing agent for temporarily adsorbing $NO_x$. Accordingly, when the ratio of air and fuel (hydrocarbon) supplied to the engine intake passage, the combustion chamber 5, and the exhaust passage on the upstream side of the $NO_x$ adsorption catalyst 22 is referred to as air-fuel ratio of exhaust gas, the $NO_x$ adsorption catalyst 22 adsorbs $NO_x$ when the air-fuel ratio of the exhaust gas flowing into the $NO_x$ adsorption catalyst 22 is in a lean range, and discharges the adsorbed $NO_x$ when the air-fuel ratio of the exhaust gas flowing into the $NO_x$ adsorption catalyst 22 is changed to a rich range.

When combustion is carried out at a lean air-fuel ratio, that is, when the air-fuel ratio of the exhaust gas is in a lean range, $NO_x$ in the exhaust gas is adsorbed in the $NO_x$ adsorption catalyst 22. However, when combustion is continuously performed at a lean air-fuel ratio, the $NO_x$ adsorption capability of the $NO_x$ adsorption catalyst 22 is saturated in the meantime and thus $NO_x$ may not be adsorbed by the $NO_x$ adsorption catalyst 22. Accordingly, before the $NO_x$ adsorption capability of the $NO_x$ adsorption catalyst 22 is saturated, the air-fuel ratio in the combustion chamber 5 is temporarily changed to a rich range so as to discharge $NO_x$ from the $NO_x$ adsorption catalyst 22.

Figure 5:
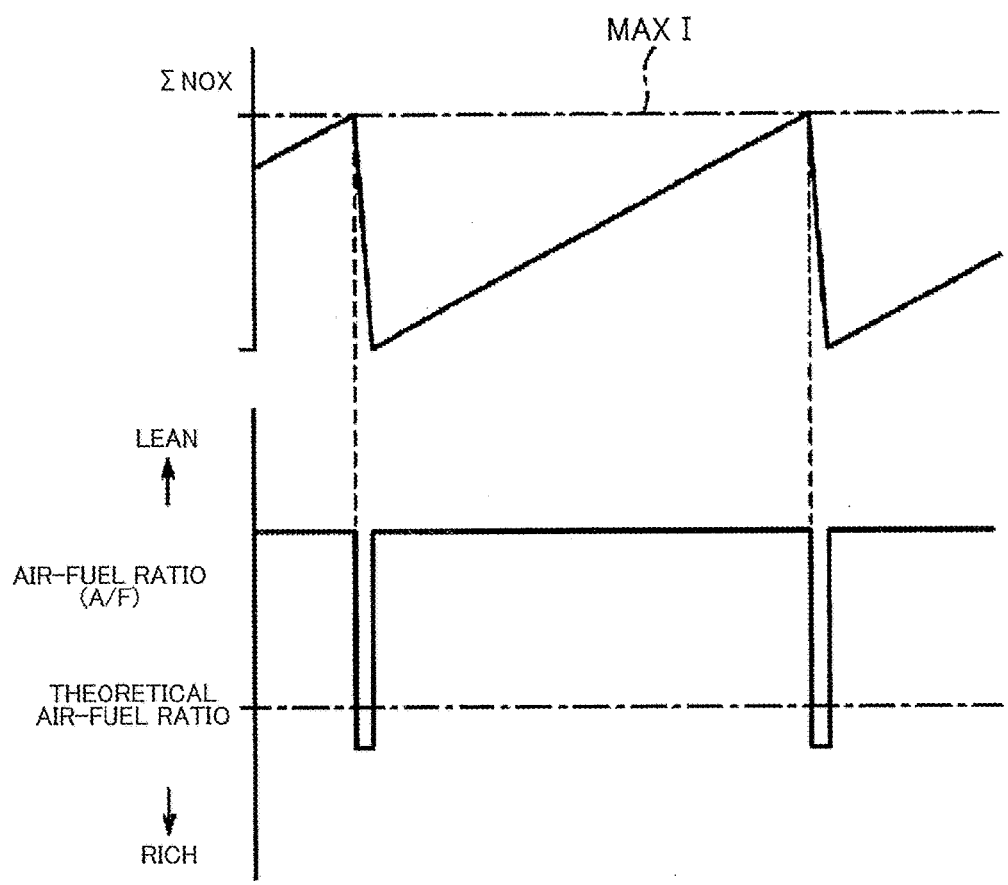
FIG. 5 is a diagram illustrating $NO_x$ discharging control.

FIG. 5 illustrates $NO_x$ discharging control from the $NO_x$ adsorption catalyst 22, which is used in the embodiment of the invention. Referring to FIG. 5, in the embodiment of the invention, when the amount of $NO_x$ adsorbed $\Sigma NOX$ by the $NO_x$ adsorption catalyst 22 is greater than a predetermined first allowable amount of $NO_x$ adsorbed MAX I, the air-fuel ratio (A/F) in the combustion chamber 5 is temporarily changed to a rich range. When the air-fuel ratio (A/F) in the combustion chamber 5 is changed to the rich range, that is, when the air-fuel ratio of the exhaust gas flowing into the $NO_x$ adsorption catalyst 22 is changed to the rich range, and when combustion is carried out at a lean air-fuel ratio, the $NO_x$ adsorbed in the $NO_x$ adsorption catalyst 22 is discharged at once from the $NO_x$ adsorption catalyst 22 and is reduced. Accordingly, $NO_x$ is purified.

Figure 6:
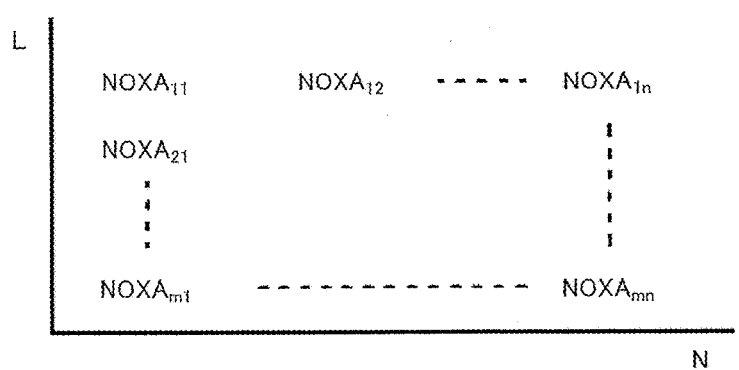
FIG. 6 is a diagram illustrating a map of an amount of $NO_x$ discharged NOXA.

The amount of $NO_x$ adsorbed $\Sigma NOX$ is calculated, for example, from the amount of $NO_x$ discharged from the engine. In the embodiment of the invention, the amount of $NO_x$ discharged NOXA discharged per unit time from the engine is stored as a function of a request load L and an engine rotation speed N in the form of a map illustrated in FIG. 6 in the ROM 32 in advance, and the amount of $NO_x$ adsorbed $\Sigma NOX$ is calculated from the amount of $NO_x$ discharged NOXA. In this case, the period in which the air-fuel ratio in the combustion chamber 5 is changed to a rich range is normally one minute or more.

FIG. 7 illustrates the $NO_x$ purification rate when $NO_x$ is purified by the $NO_x$ adsorbing and discharging operation of the $NO_x$ adsorption catalyst 22 illustrated in FIG. 5. The horizontal axis in FIG. 7 represents the catalyst temperature of the $NO_x$ adsorption catalyst 22. In this case, as can be seen from FIG. 7, the $NO_x$ purification rate is very high when the catalyst temperature TC ranges from 300° C. to 400° C., but the $NO_x$ purification rate is lowered when the catalyst temperature TC is equal to or higher than 400° C. The reason why the $NO_x$ purification rate is lowered when the catalyst temperature TC is equal to or higher than 400° C. is that it is difficult to adsorb $NO_x$ and nitrate is pyrolyzed and is discharged in the form of $NO_2$ from the $NO_x$ adsorption catalyst 22, when the catalyst temperature TC is equal to or higher than 400° C. That is, as long as $NO_x$ is adsorbed in the form of nitrate, it is difficult to obtain a high $NO_x$ purification rate when the catalyst temperature TC is high.

When combustion is carried out at a lean air-fuel ratio, the amount of fuel consumed becomes less than that when combustion is carried out at the theoretical air-fuel ratio. Accordingly, in order to reduce the amount of fuel consumed, it is preferable that combustion be carried out an air-fuel ratio which is as low as possible. However, as can be seen from FIG. 7, when the temperature TC of the $NO_x$ adsorption catalyst 22 rises, the $NO_x$ purification rate is lowered. On the contrary, when combustion is carried out at the theoretical air-fuel ratio, the $NO_x$ purification rate is not lowered in spite of a rise in the temperature TC of the three-way catalyst 20. Accordingly, in the related art, combustion is carried out at a lean air-fuel ratio in a low-load engine operation in which the temperature TC of the $NO_x$ adsorption catalyst 22 is low, and combustion is carried out at the theoretical air-fuel ratio in a high-load engine operation in which the temperature TC of the $NO_x$ adsorption catalyst 22 is high.

Under these circumstances, by observing and studying the adsorption operation of NO, the inventors found a new $NO_x$ purifying method capable of achieving a high $NO_x$ purification rate even when the temperature TC of the $NO_x$ adsorption catalyst 22 is high and combustion is carried out at a lean air-fuel ratio. That is, it has been known that NO is adsorbed on the $NO_x$ adsorption catalyst 22. However, the behavior of adsorbed NO has hardly been studied ever. Therefore, the inventors studied the behavior of adsorbed NO and found that a high $NO_x$ purification rate could be secured even when the temperature TC of the $NO_x$ adsorption catalyst 22 is high and combustion is carried out at a lean air-fuel ratio. Since this new $NO_x$ purifying method employs the adsorption operation of NO, the new $NO_x$ purifying method is referred to as a $NO_x$ purifying method using adsorbed NO. Therefore, the $NO_x$ purifying method using adsorbed NO will be described below with reference to FIGS. 8A to 13.

Figure 8A:
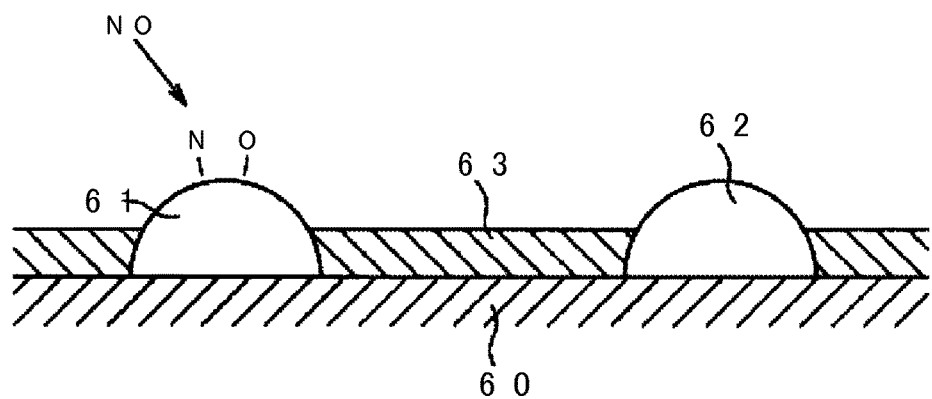
FIGS. 8A and 8B are diagrams illustrating an oxidation-reduction reaction in the $NO_x$ adsorption catalyst.
Figure 8B:
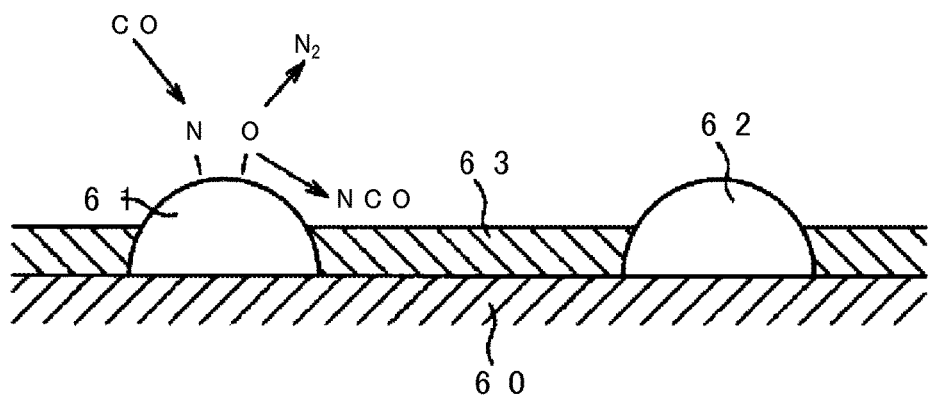

FIGS. 8A and 8B are enlarged views of FIG. 3B, that is, the views illustrate a surface part of the catalyst carrier 60 of the $NO_x$ adsorption catalyst 22. FIG. 8A illustrates a case in which combustion is carried out at a lean air-fuel ratio and FIG. 8B illustrates a case in which the air-fuel ratio in the combustion chamber 5 is changed to a rich range. When combustion is carried out at a lean air-fuel ratio, that is, when the air-fuel ratio of exhaust gas is in a lean range, $NO_x$ included in the exhaust gas is adsorbed in the basic layer 63 as described above, but a part of NO included in the exhaust gas is dissociated and adsorbed on the surface of the platinum Pt 61 as illustrated in FIG. 8A. The amount of NO adsorbed on the surface of the platinum Pt 61 increases with the lapse of time and thus the amount of NO adsorbed on the $NO_x$ adsorption catalyst 22 increases with the lapse of time.

On the other hand, when the air-fuel ratio in the combustion chamber 5 is changed to a rich range, a large amount of carbon monoxide CO is discharged from the combustion chamber 5 and thus a large amount of carbon monoxide CO is included in the exhaust gas flowing into the $NO_x$ adsorption catalyst 22. The carbon monoxide CO reacts with NO dissociated and adsorbed on the surface of the platinum Pt 61 as illustrated in FIG. 8B, NO becomes $N_2$ on the one hand and becomes a reducing intermediate NCO on the other hand. The reducing intermediate NCO is continuously maintained and adsorbed on the surface of the basic layer 63 during a predetermined time after being produced. Accordingly, the amount of reducing intermediate NCO on the basic layer 63 gradually increases with the lapse of time. The reducing intermediate NCO reacts with $NO_x$ included in the exhaust gas and thus $NO_x$ included in the exhaust gas is purified.

In this way, when combustion is carried out at a lean air-fuel ratio, that is, when the air-fuel ratio of the exhaust gas is in a lean range, $NO_x$ included in the exhaust gas is adsorbed in the $NO_x$ adsorption catalyst 22 on the one hand as illustrated in FIG. 4A, and NO included in the exhaust gas is adsorbed on the $NO_x$ adsorption catalyst 22 on the other hand as illustrated in FIG. 8A. That is, at this time, $NO_x$ included in the exhaust gas is adsorbed in the $NO_x$ adsorption catalyst 22. On the contrary, when the air-fuel ratio in the combustion chamber 5 is changed to a rich range, $NO_x$ adsorbed or adsorbed on the $NO_x$ adsorption catalyst 22, that is, $NO_x$ adsorbed in the $NO_x$ adsorption catalyst 22, is discharged from the $NO_x$ adsorption catalyst 22.

Figure 9A:
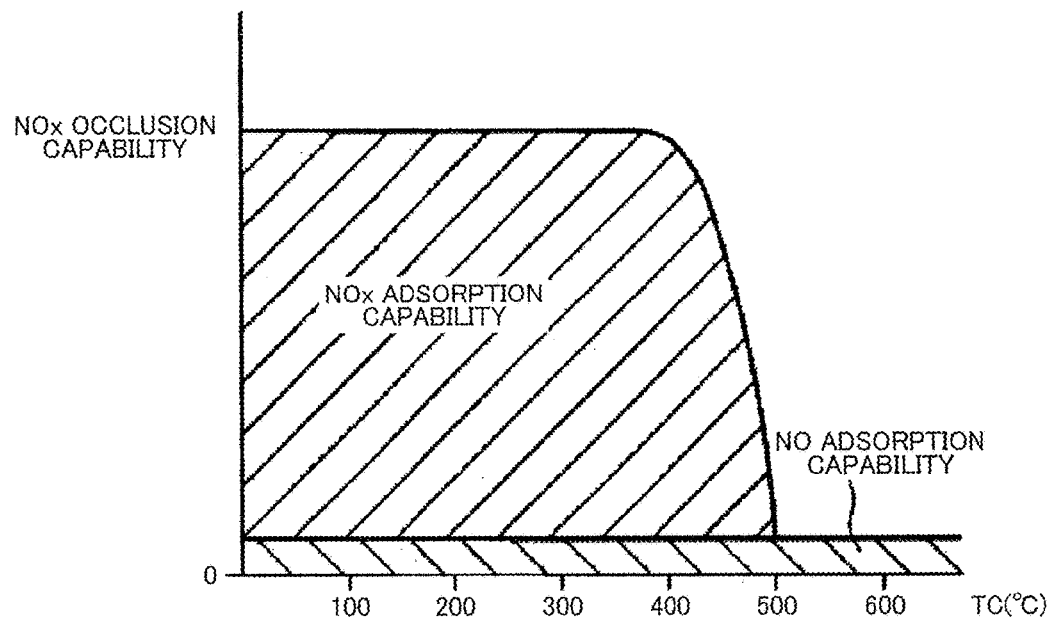
FIGS. 9A and 9B are diagrams illustrating $NO_x$ absorption capability and NO adsorption capability.

FIG. 9A illustrates $NO_x$ absorption capability and NO adsorption capability when $NO_x$ is purified using the $NO_x$ adsorbing and discharging operation of the $NO_x$ adsorption catalyst 22 as illustrated in FIG. 5. In FIG. 9A, the vertical axis represents the $NO_x$ adsorption capability which is the sum of the $NO_x$ absorption capability and the NO adsorption capability and the horizontal axis represents the temperature TC of the $NO_x$ adsorption catalyst 22. As can be seen from FIG. 9A, when the temperature TC of the $NO_x$ adsorption catalyst 22 is lower than 400° C., the $NO_x$ absorption capability and the NO adsorption capability are constant regardless of the temperature TC of the $NO_x$ adsorption catalyst 22. Accordingly, the $NO_x$ adsorption capability which is the sum of the $NO_x$ absorption capability and the NO adsorption capability is also constant regardless of the temperature TC of the $NO_x$ adsorption catalyst 22.

On the other hand, when the temperature TC of the $NO_x$ adsorption catalyst 22 rises, the $NO_x$ oxidation-reduction reaction (NO→$NO_2$) on the surface of the platinum Pt 61 occurs faster. However, when the temperature TC of the $NO_x$ adsorption catalyst 22 rises, the reaction ($NO_2$+Ba$(CO_3)_2$→Ba$(NO_3)_2$+$CO_2$) in which $NO_2$ becomes nitrate ions $NO_3^-$ occurs slower and thus $NO_x$ is not likely to be adsorbed in the $NO_x$ adsorption catalyst 22. When the temperature TC of the $NO_x$ adsorption catalyst 22 rises, nitrate is pylolyzed and is discharged in the form of $NO_2$ from the $NO_x$ adsorption catalyst 22. Accordingly, as illustrated in FIG. 9A, when the temperature TC of the $NO_x$ adsorption catalyst 22 rises to be equal to or higher than 400° C., the $NO_x$ absorption capability rapidly decreases. On the contrary, the amount of NO adsorbed on the surface of the platinum Pt 61 is hardly affected by the temperature TC of the $NO_x$ adsorption catalyst 22. Accordingly, as illustrated in FIG. 9A, the NO adsorption capability hardly varies even when the temperature TC of the $NO_x$ adsorption catalyst 22 rises.

The relationship between the oxygen concentration in the exhaust gas, the NO adsorption capability, and the $NO_x$ absorption capability when combustion is carried out at a lean air-fuel ratio will be described below with reference to FIGS. 10A, 10B. First, considering the adsorption onto the surface of the platinum Pt 61, NO and $O_2$ are competitively adsorbed on the surface of the platinum Pt 61. That is, the greater the amount of NO included in the exhaust gas becomes than the amount of $O_2$, the amount of NO adsorbed on the surface of the platinum Pt 61 becomes greater than the amount of $O_2$. On the contrary, the greater the amount of $O_2$ included in the exhaust gas becomes than the amount of NO, the less the amount of NO adsorbed on the surface of the platinum Pt 61 becomes than the amount of $O_2$. Accordingly, the NO adsorption capability of the $NO_x$ adsorption catalyst 22 becomes lower as the oxygen concentration in the exhaust gas becomes higher, as illustrated in FIG. 10A.

On the other hand, as the oxygen concentration in the exhaust gas becomes higher, the oxidation operation of NO in the exhaust gas is promoted and the absorption of $NO_x$ in the $NO_x$ adsorption catalyst 22 is promoted. Accordingly, as illustrated in FIG. 10B, the $NO_x$ absorption capability of the $NO_x$ adsorption catalyst 22 becomes higher as the oxygen concentration in the exhaust gas becomes higher. In FIGS. 10A, 10B, area X represents a case in which combustion is carried out at a lean air-fuel ratio when $NO_x$ is purified using the NOx adsorbing and discharging operation of the $NO_x$ adsorption catalyst 22 as illustrated in FIG. 5. At this time, it can be seen that the NO adsorption capability is low and the $NO_x$ absorption capability is high. FIG. 9A illustrates the NO adsorption capability and the $NO_x$ absorption capability at this time.

As described above with reference to FIG. 9A, when the temperature TC of the $NO_x$ adsorption catalyst 22 rises to be equal to or higher than 400° C., the $NO_x$ absorption capability rapidly decreases. On the other hand, the NO adsorption capability hardly varies even when the temperature TC of the $NO_x$ adsorption catalyst 22 rises. Accordingly, when the temperature TC of the $NO_x$ adsorption catalyst 22 rises to be equal to or higher than 400° C., it can be considered that $NO_x$ can be purified by using the $NO_x$ purifying method using the NO adsorbing operation instead of the $NO_x$ purifying method using the $NO_x$ adsorbing operation. However, as can be seen from FIG. 9A, when the NO adsorption capability is low and it is intended to purify $NO_x$ using the NO adsorbing operation without causing an increase in the amount of fuel consumed, it is necessary to increase the NO adsorption capability.

Figure 9B:
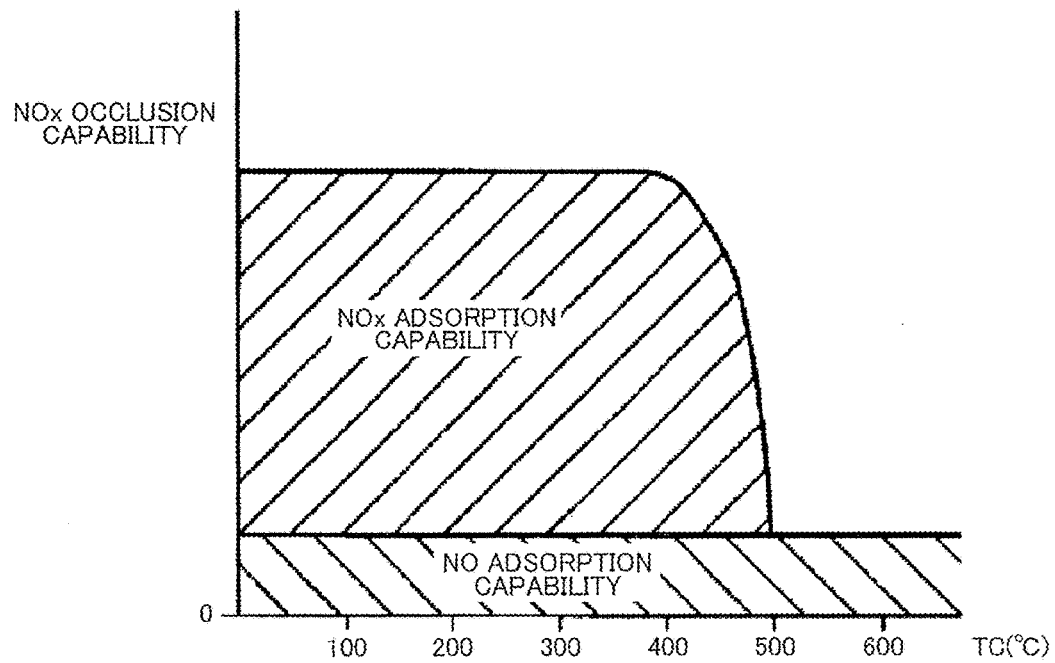
Figure 10A:
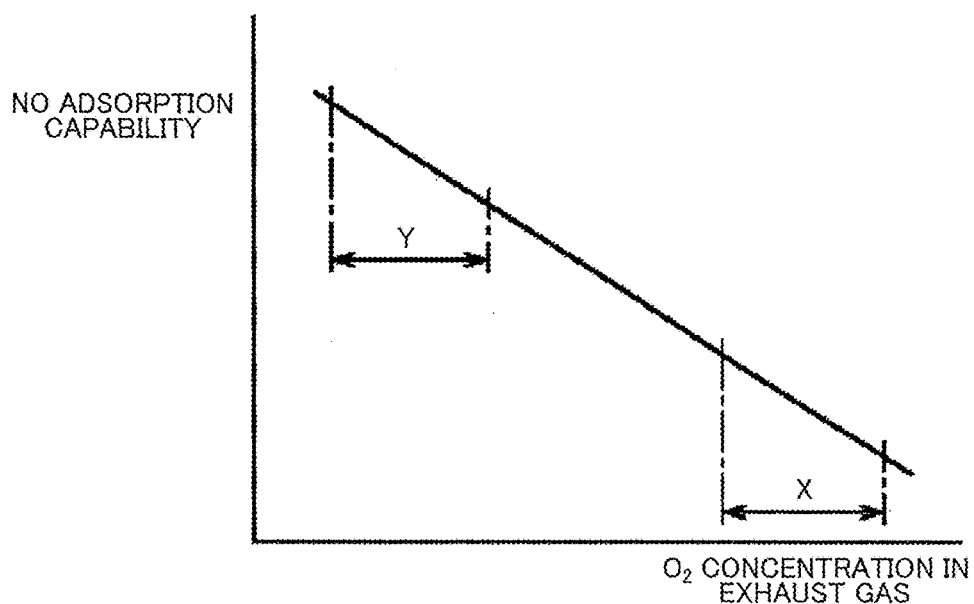
FIGS. 10A and 10B are diagrams illustrating $NO_x$ absorption capability and NO adsorption capability.
Figure 10B:
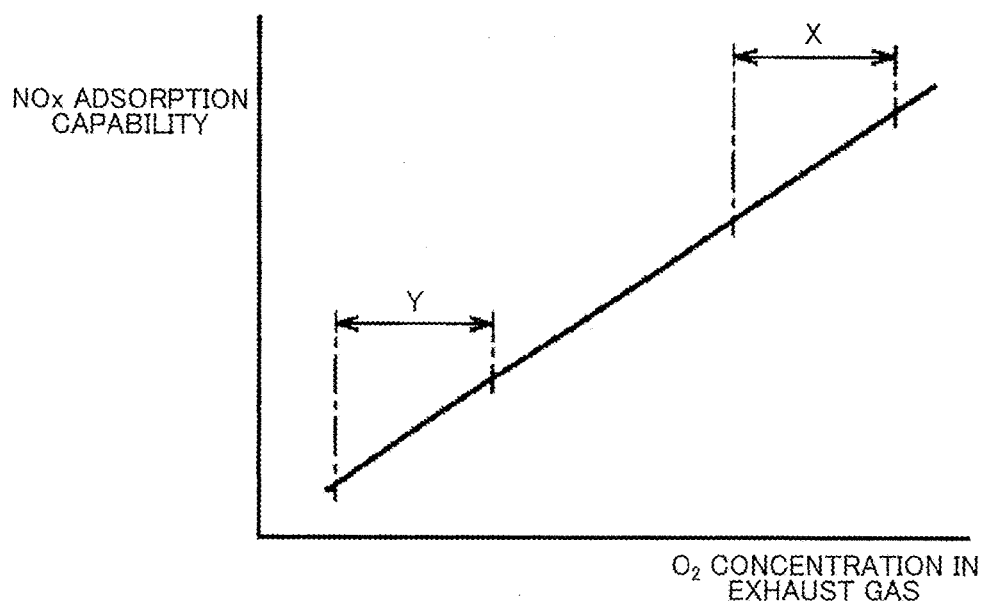

In this case, when it is intended to increase the NO adsorption capability, the oxygen concentration in the exhaust gas can be lowered as can be seen from FIG. 10A. At this time, the $NO_x$ absorption capability decreases as illustrated in FIG. 10B. The $NO_x$ absorption capability and the NO adsorption capability when the oxygen concentration is lowered to area Y in the exhaust gas in FIGS. 10A, 10B are illustrated in FIG. 9B. By lowering the oxygen concentration in the exhaust gas in this way, it is possible to increase the NO adsorption capability. The lowering of the oxygen concentration in the exhaust gas means the lowering in the air-fuel ratio (referred to as base air-fuel ratio) when combustion is carried out at a lean air-fuel ratio and it is thus possible to increase the NO adsorption capability by lowering the base air-fuel ratio.

Figure 11A:
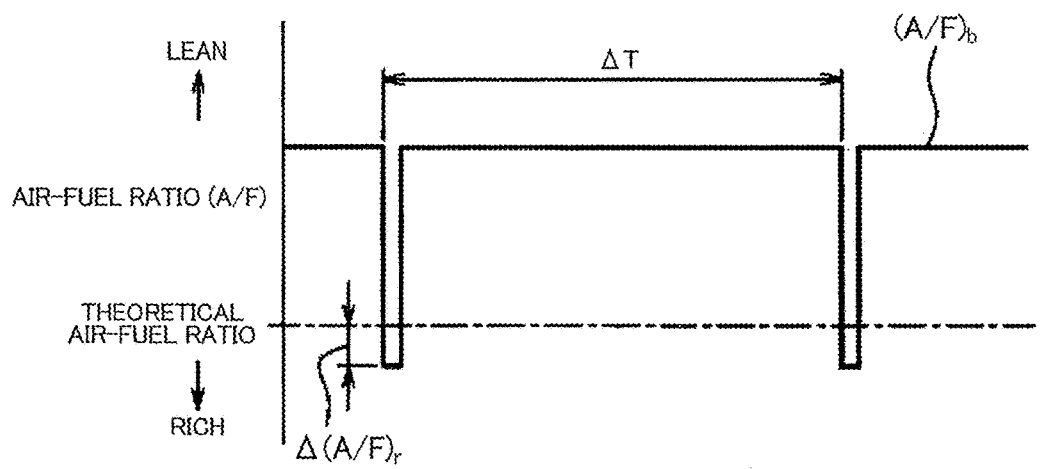
FIGS. 11A, 11B, 11C are timing diagrams illustrating a variation in the air-fuel ratio of exhaust gas discharged from an engine.
Figure 11B:
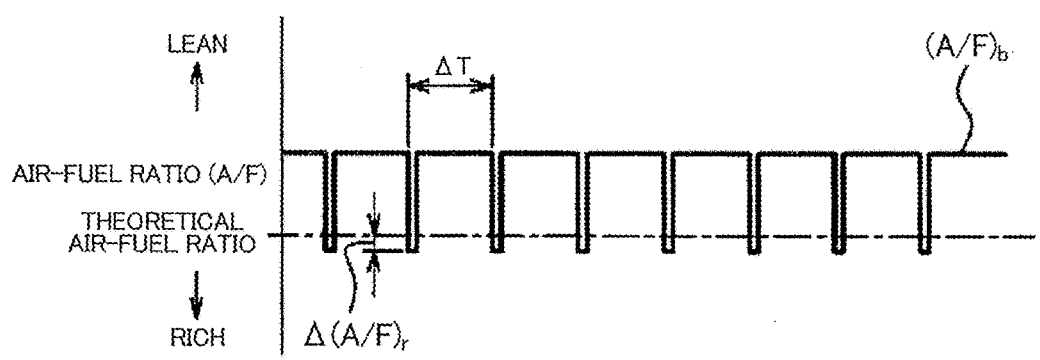

Therefore, in the invention, the base air-fuel ratio is lowered when $NO_x$ is purified using the NO adsorbing operation, that is, in the $NO_x$ purifying method using adsorbed NO. This will be described below with reference to FIGS. 11A to 11C. FIG. 11A illustrates a variation in the air-fuel ratio (A/F) in the combustion chamber 5 when $NO_x$ is purified using the NOx adsorbing and discharging operation of the $NO_x$ adsorption catalyst 22, similarly to the case illustrated in FIG. 5. In FIG. 11A, (A/F)b represents the base air-fuel ratio, Δ(A/F)r represents the degree of richness of the air-fuel ratio, and ΔT represents the rich period of the air-fuel ratio. On the other hand, FIG. 11B illustrates a variation in the air-fuel ratio (A/F) in the combustion chamber 5 when $NO_x$ is purified using the NO adsorbing operation. In FIG. 11B, (A/F)b represents the base air-fuel ratio, Δ(A/F)r represents the degree of richness of the air-fuel ratio, and ΔT represents the rich period of the air-fuel ratio.

Figure 11C:
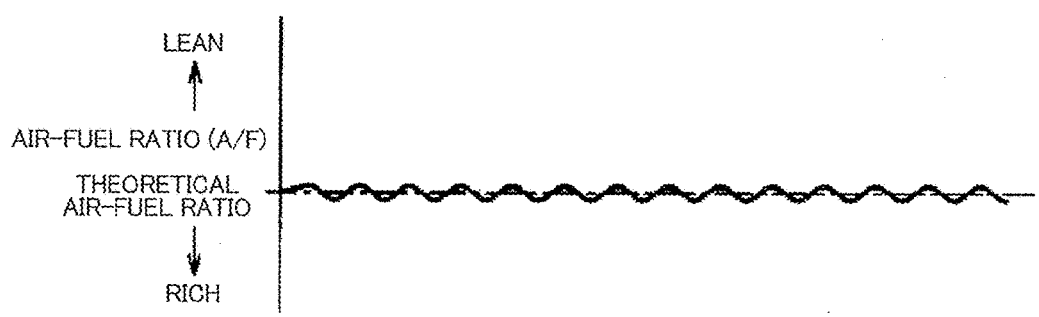

As can be seen from the comparison result of FIGS. 11A, 11B, when $NO_x$ is purified using the NO adsorbing operation as illustrated in FIG. 11B, combustion in the combustion chamber 5 is carried out at a base air-fuel ratio (A/F)b less than the base air-fuel ratio (A/F)b when $NO_x$ is purified using the NOx adsorbing and discharging operation of the $NO_x$ adsorption catalyst 22 as illustrated in FIG. 11A, and the air-fuel ratio in the combustion chamber 5 is changed to a rich range with a period shorter than the rich period ΔT of the air-fuel ratio for discharging $NO_x$ when $NO_x$ is purified using the NOx adsorbing and discharging operation of the $NO_x$ adsorption catalyst 22 as illustrated in FIG. 11A. On the other hand, FIG. 11C illustrates a variation in the air-fuel ratio in the combustion chamber 5 when the air-fuel ratio in the combustion chamber 5 is controlled to the theoretical air-fuel ratio in a feedback manner.

Figure 12:
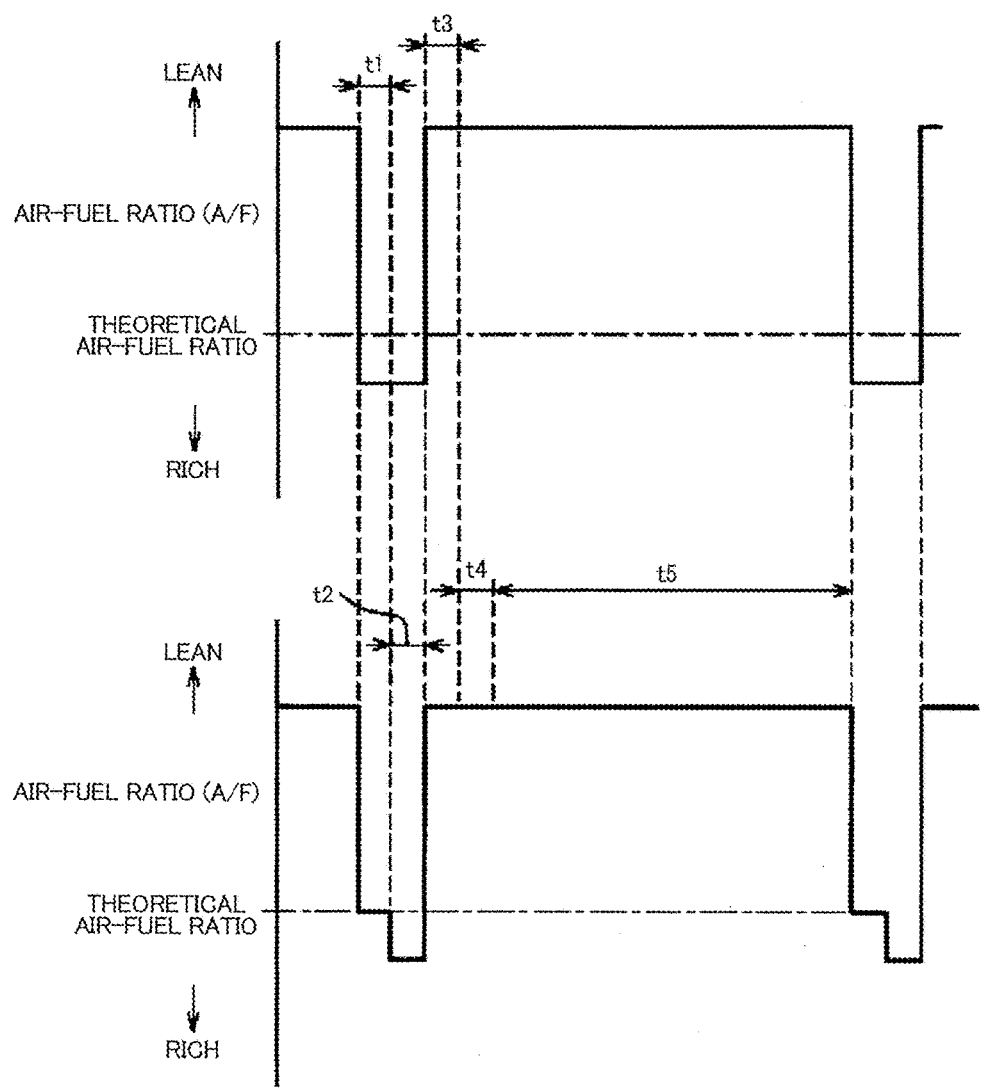
FIG. 12 is a timing diagram illustrating a variation in the air-fuel ratio of exhaust gas flowing into a three-way catalyst and an $NO_x$ adsorption catalyst.

FIG. 12 illustrates a variation in the air-fuel ratio (A/F) in the combustion chamber 5 and a variation in the air-fuel ratio (A/F) in of the exhaust gas flowing into the $NO_x$ adsorption catalyst 22 when $NO_x$ is purified using the NO adsorbing operation as illustrated in FIG. 11B. In this case, when the air-fuel ratio (A/F) in the combustion chamber 5 is changed to a rich range, oxygen stored in the three-way catalyst 20 is discharged, the air-fuel ratio is maintained at the theoretical air-fuel ratio during time t1, and HC, CO, and $NO_x$ are accordingly reduced together. In the meantime, as illustrated in FIG. 12, the air-fuel ratio (A/F) in of the exhaust gas flowing into the $NO_x$ adsorption catalyst 22 is maintained at the theoretical air-fuel ratio. Subsequently, when oxygen stored in the three-way catalyst 20 is consumed, the air-fuel ratio (A/F) in of the exhaust gas flowing into the $NO_x$ adsorption catalyst 22 is in a rich range during time t2. At this time, as illustrated in FIG. 8B, NO dissociated and adsorbed on the surface of the platinum Pt 61 becomes $N_2$ on the one side and becomes a reducing intermediate NCO on the other hand. The reducing intermediate NCO is continuously maintained and adsorbed on the surface of the basic layer 63 during a predetermined time after being produced.

Subsequently, when the air-fuel ratio (A/F) in the combustion chamber 5 is returned to a lean range, oxygen is stored in the three-way catalyst 20. At this time, on the catalyst surface of the three-way catalyst 20, the air-fuel ratio is maintained at the theoretical air-fuel ration during time t3 and HC, CO, and $NO_x$ are accordingly reduced together. Subsequently, $NO_x$ included in the exhaust gas reacts with the reducing intermediate NCO maintained or adsorbed on the surface of the basic layer 63 and is reduced by the reducing intermediate NCO during time t4. Subsequently, NO included in the exhaust gas is dissociated and adsorbed on the surface of the platinum Pt 61 during time t5 as illustrated in FIG. 8A.

Figure 13:
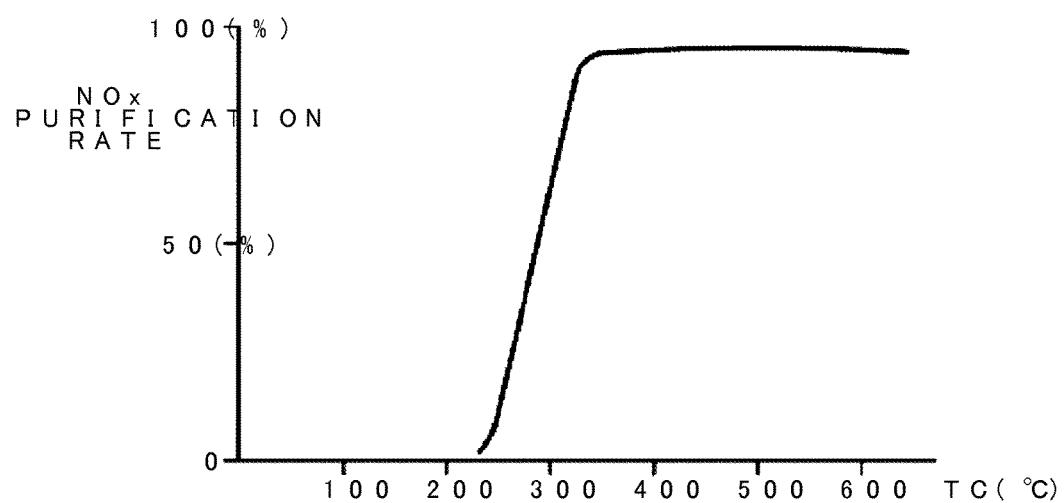
FIG. 13 is a diagram illustrating an $NO_x$ purification rate.

In this way, when $NO_x$ is purified using the NO adsorbing operation as illustrated in FIG. 11B, two purification operations of the $NO_x$ purifying operation using the NO adsorbing operation and the $NO_x$ purifying operation using the oxygen storage function of the three-way catalyst 20 are carried out. The $NO_x$ purification rate at this time is illustrated in FIG. 13. As illustrated in FIG. 13, in this case, it can be seen that the $NO_x$ purification rate is not lowered even when the temperature TC of the $NO_x$ adsorption catalyst 22 rises to be equal to or higher than 400° C.

Figure 14:
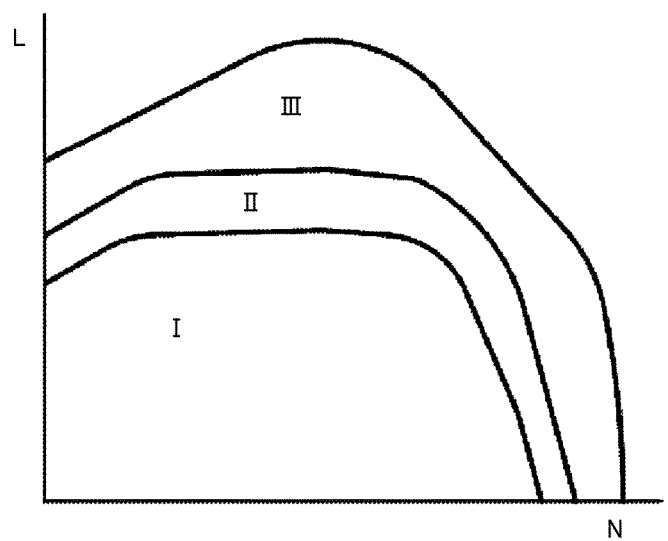
FIG. 14 is a diagram illustrating operation areas of the engine.

The engine operation control will be described below in brief. In the invention, as illustrated in FIG. 14, a low-load engine operation area I on a low-load engine operation side, a high-load engine operation area III on a high-load engine operation side, and a middle-load engine operation area II is set between the low-load engine operation area I and the high-load engine operation area III are set in advance. In FIG. 14, the vertical axis L represents a request load, and the horizontal axis N represents an engine rotation speed. In this case, In the low-load engine operation area I, the $NO_x$ purifying operation of purifying $NO_x$ using the $NO_x$ adsorbing and discharging operation of the $NO_x$ adsorption catalyst 22 is performed as illustrated in FIG. 11A. In the middle-load engine operation area II, the $NO_x$ purifying operation of purifying $NO_x$ using the NO adsorbing operation is performed as illustrated in FIG. 11B. In the high-load engine operation area III, the air-fuel ratio in the combustion chamber 5 is controlled to the theoretical air-fuel ratio in the feedback manner as illustrated in FIG. 11C.

That is, in the invention, in the exhaust gas control apparatus for an internal combustion engine in which the three-way catalyst 20 and the $NO_x$ adsorption catalyst 22 adsorbing $NO_x$ in the exhaust gas when an air-fuel ratio of introduced exhaust gas is in a lean range and discharging the adsorbed $NO_x$ when the air-fuel ratio of the introduced exhaust gas is changed to a rich range are disposed in the engine exhaust passage, the operation area of an engine includes the predetermined low-load engine operation area I on the low-load engine operation side, the predetermined high-load engine operation area III on the high-load engine operation side, and the predetermined middle-load engine operation area II on the middle-load engine operation side is set between the low-load engine operation area I and the high-load engine operation area III. In the predetermined low-load engine operation area I, combustion in the combustion chamber 5 is carried out at a lean base air-fuel ratio and the air-fuel ratio in the combustion chamber 5 is changed to the rich range at the time of discharging $NO_x$ from the $NO_x$ adsorption catalyst 22. In the predetermined high-load engine operation area III, the air-fuel ratio in the combustion chamber 5 is controlled to the theoretical air-fuel ratio in a feedback manner. In the predetermined middle-load engine operation area II, the combustion in the combustion chamber 5 is carried out at the base air-fuel ratio lower than the base air-fuel ratio in the low-load engine operation area I and the air-fuel ratio in the combustion chamber 5 is changed to the rich range with a period shorter than a rich period of the air-fuel ratio for discharging $NO_x$ in the low-load engine operation area I.

As can be seen from FIGS. 11A to 11C, the base air-fuel ratio in the middle-load engine operation area II is an intermediate value between the base air-fuel ratio in the low-load engine operation area I and the theoretical air-fuel ratio, and the degree of richness of the air-fuel ratio when the air-fuel ratio in the combustion chamber 5 is changed to the rich range in the middle-load engine operation area II is less than the degree of richness of the air-fuel ratio when the air-fuel ratio in the combustion chamber 5 is changed to the rich range in the low-load engine operation area I.

Figure 15:
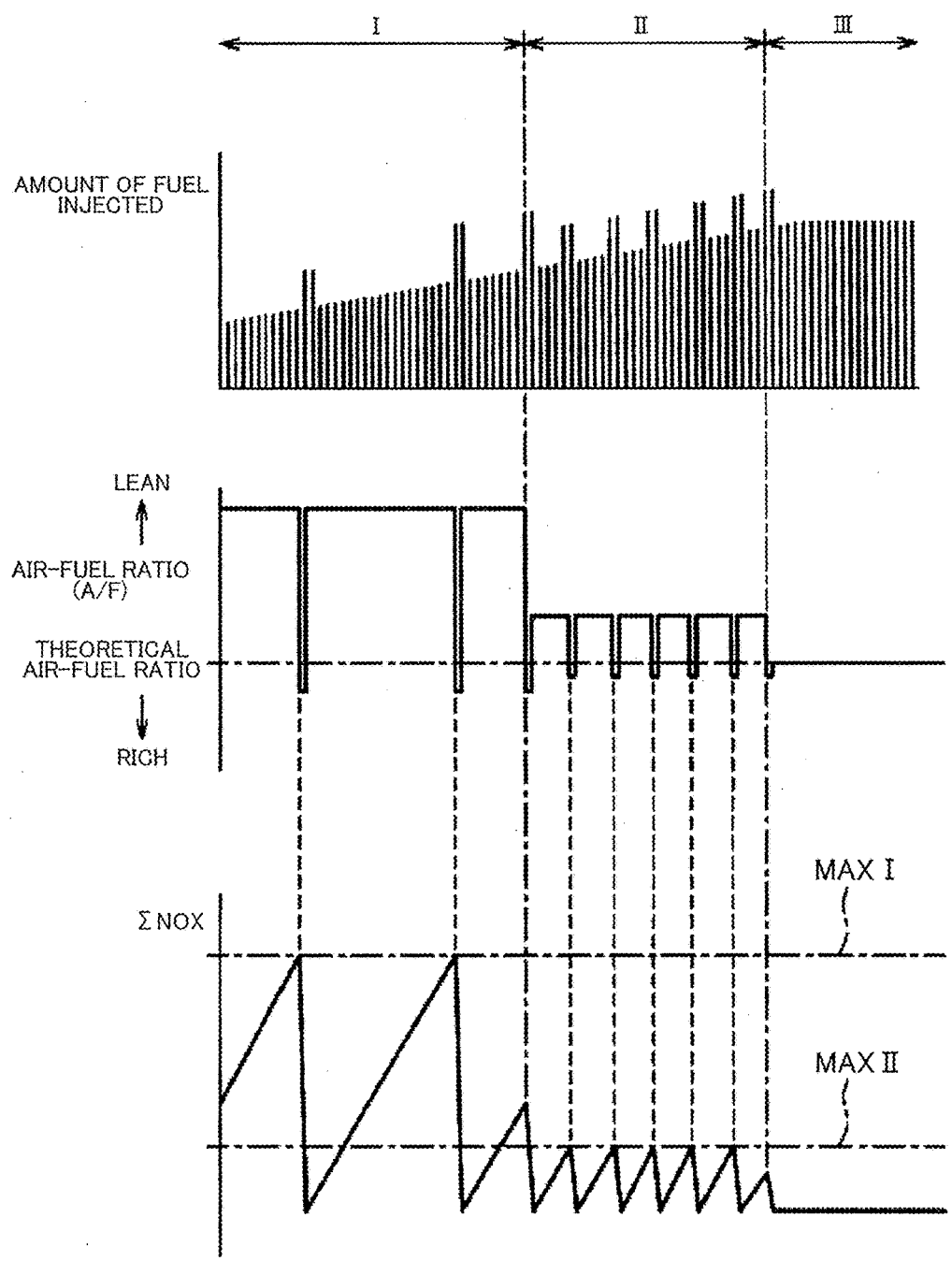
FIG. 15 is a timing diagram illustrating a variation in the amount of fuel injected or the like at the time of operating the engine.

The $NO_x$ purifying method will be described below with reference to FIG. 15 illustrating a case in which the operation state is changed from the low-load operation to the high-load operation. FIG. 15 illustrates a variation in the amount of fuel injected into the combustion chamber 5, a variation in the air-fuel ratio (A/F) in the combustion chamber 5, and a variation in the amount of $NO_x$ adsorbed $\Sigma NOX$. In FIG. 15, MAX I represents a first allowable amount of $NO_x$ adsorbed, and MAX II represents a second allowable amount of $NO_x$ adsorbed. As can be seen from FIG. 15, the second allowable amount of $NO_x$ adsorbed MAX II is set to a value less than the first allowable amount of $NO_x$ adsorbed MAX I.

In FIG. 15, in the low-load engine operation area I, when the amount of $NO_x$ adsorbed $\Sigma NOX$ is greater than the first allowable amount of $NO_x$ adsorbed MAX I, the air-fuel ratio in the combustion chamber 5 is temporarily changed to the rich range. On the other hand, when the $NO_x$ purifying method is switched to the $NO_x$ purifying method using the NO adsorbing operation illustrated in FIG. 11B in the state in which $NO_x$ is adsorbed in the $NO_x$ adsorption catalyst 22, a part of $NO_x$ adsorbed in the $NO_x$ adsorption catalyst 22 is not reduced but discharged just after switching to the $NO_x$ purifying method using the NO adsorbing operation. Accordingly, in the embodiment of the invention, as illustrated in FIG. 15, when the engine operation state transitions from the low-load engine operation area I to the middle-load engine operation area II, the air-fuel ratio (A/F) in the combustion chamber 5 is temporarily changed to the rich range.

in the middle-load engine operation area II, as illustrated in FIG. 15, when the amount of $NO_x$ adsorbed $\Sigma NOX$ is greater than the second allowable amount of $NO_x$ adsorbed MAX II, the air-fuel ratio in the combustion chamber 5 is temporarily changed to the rich range. In the middle-load engine operation area II, since the temperature of the $NO_x$ adsorption catalyst 22 is high, $NO_x$ is hardly adsorbed in the $NO_x$ adsorption catalyst 22 and most of $NO_x$ is adsorbed NO. In other words, the amount of $NO_x$ adsorbed on the $NO_x$ adsorption catalyst 22 is calculated, and the air-fuel ratio (A/F) in the combustion chamber 5 is changed to the rich range when the amount of NO adsorbed $\Sigma NOX$ is greater than a predetermined allowable amount of NO adsorbed MAX II at the time of operating the engine in the middle-load engine operation area II.

In this way, in the embodiment of the invention, the amount of $NO_x$ adsorbed $\Sigma NOX$ adsorbed in the $NO_x$ adsorption catalyst 22 is calculated, the air-fuel ratio (A/F) in the combustion chamber 5 is changed to the rich range when the amount of $NO_x$ adsorbed $\Sigma NOX$ is greater than the predetermined first allowable amount of $NO_x$ adsorbed MAX I at the time of operating the engine in the low-load engine operation area I, the air-fuel ratio (A/F) in the combustion chamber 5 is changed to the rich range when the amount of $NO_x$ adsorbed $\Sigma NOX$ is greater than the predetermined second allowable amount of $NO_x$ adsorbed MAX II at the time of operating the engine in the middle-load engine operation area II, and the second allowable amount of $NO_x$ adsorbed MAX II is set to a value less than the first allowable amount of $NO_x$ adsorbed MAX I.

On the other hand, when the $NO_x$ purifying method is switched to the $NO_x$ purifying method using the feedback control to the theoretical air-fuel ratio illustrated in FIG. 11C in the state in which $NO_x$ is adsorbed in the $NO_x$ adsorption catalyst 22, a part of $NO_x$ adsorbed in the $NO_x$ adsorption catalyst 22 is not reduced but discharged just after switching to the $NO_x$ purifying method using the feedback control to the theoretical air-fuel ratio. Accordingly, in the embodiment of the invention, as illustrated in FIG. 15, when the engine operation state transitions from the middle-load engine operation area II to the high-load engine operation area III, the air-fuel ratio (A/F) in the combustion chamber 5 is temporarily changed to the rich range.

In the high-load engine operation area III, the amounts of fuel injected from the fuel injection valves 11, 12 are feedback-controlled on the basis of the output signal of the air-fuel ratio sensor 27 such that the air-fuel ratio in the combustion chamber 5 reaches the theoretical air-fuel ratio. At this time, the harmful components HC, CO, and $NO_x$ are purified together by the three-way catalyst 20.

When the air-fuel ratio is changed to the rich range as illustrated in FIG. 15, ammonia may be produced at this time. However, in the embodiment of the invention, the ammonia is adsorbed on the $NO_x$ selective-reduction catalyst 23. The ammonia adsorbed on the $NO_x$ selective-reduction catalyst 23 reacts with $NO_x$ included in the exhaust gas and is used to reduce $NO_x$.

Figure 16:
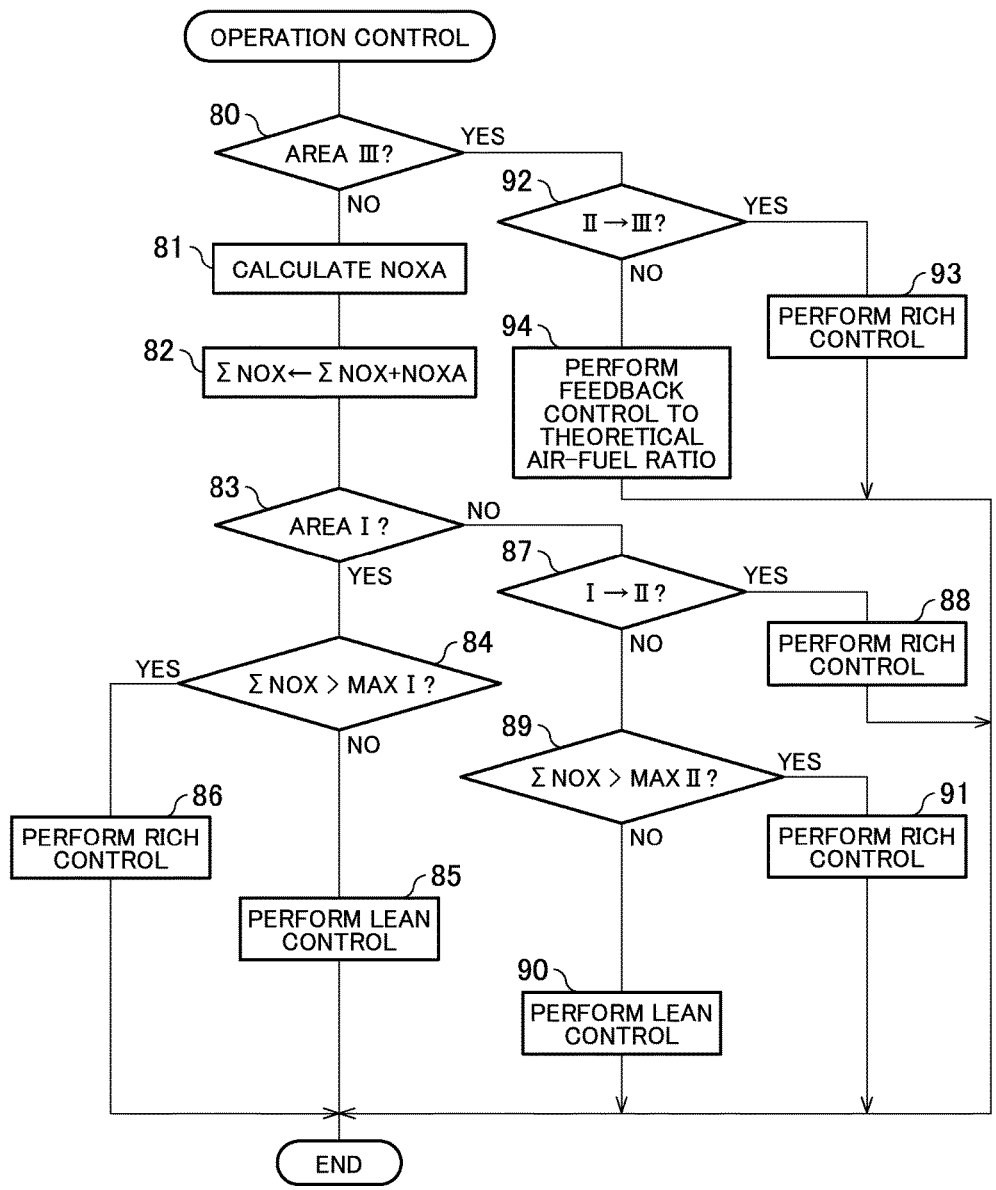
FIG. 16 is a flowchart illustrating operation control of the engine.

FIG. 16 illustrates an operation control flow. This flow is performed by interruption for every predetermined time.

Referring to FIG. 16, first, in step S80, it is determined whether the engine operation state is in the high-load engine operation area III illustrated in FIG. 14. When it is determined that the engine operation state is not in the high-load engine operation area III, the control flow moves to step 81 and the amount of $NO_x$ discharged NOXA per unit time is calculated from the map illustrated in FIG. 6. Subsequently, in step 82, the amount of $NO_x$ adsorbed $\Sigma NOX$ is calculated by adding the amount of $NO_x$ discharged NOXA to $\Sigma NOX$. Subsequently, in step 83, it is determined whether the engine operation state is in the low-load engine operation area I illustrated in FIG. 14. When it is determined that the engine operation state is in the low-load engine operation area I illustrated in FIG. 14, the control flow moves to step 84.

In step 84, it is determined whether the amount of $NO_x$ adsorbed ΣNOX is greater than the first allowable amount of $NO_x$ adsorbed MAX I. When it is determined that the amount of $NO_x$ adsorbed ΣNOX is not greater than the first allowable amount of $NO_x$ adsorbed MAX I, the control flow moves to step 85 and the air-fuel ratio in the combustion chamber 5 is changed to a rich air-fuel ratio determined in advance depending on the engine operation state. At this time, combustion is carried out at a lean base air-fuel ratio. On the contrary, when it is determined in step 84 that the amount of $NO_x$ adsorbed ΣNOX is greater than the first allowable amount of $NO_x$ adsorbed MAX I, the control flow moves to step 86 and the air-fuel ratio in the combustion chamber 5 is temporarily changed to the rich range and ΣNOX is cleared. At this time, $NO_x$ adsorbed in the $NO_x$ adsorption catalyst 22 is discharged from the $NO_x$ adsorption catalyst 22.

On the other hand, when it is determined in step 83 that the engine operation state is not in the low-load engine operation area I illustrated in FIG. 14, that is, when it is determined that the engine operation state is in the middle-load engine operation area II illustrated in FIG. 14, the control flow moves to step 87 and it is determined whether the current engine operation state currently transitions from the low-load engine operation area I to the middle-load engine operation area II. When it is determined that the current engine operation state currently transitions from the low-load engine operation area I to the middle-load engine operation area II, the control flow moves to step 88 and the air-fuel ratio in the combustion chamber 5 is temporarily changed to the rich range. On the other hand, when it is determined that the engine operation state transitions already from the low-load engine operation area I to the middle-load engine operation area II, the control flow moves to step 89.

In step 89, it is determined whether the amount of $NO_x$ adsorbed ΣNOX is greater than the second allowable amount of $NO_x$ adsorbed MAX II. When it is determined that the amount of $NO_x$ adsorbed ΣNOX is not greater than the second allowable amount of $NO_x$ adsorbed MAX II, the control flow moves to step 90 and the air-fuel ratio in the combustion chamber 5 is changed to a lean air-fuel ratio determined in advance depending on the engine operation state. At this time, combustion is carried out at a lean base air-fuel ratio. The base air-fuel ratio at this time is less than the base air-fuel ratio in the low-load engine operation area I. On the other hand, when it is determine din step 89 that the amount of $NO_x$ adsorbed ΣNOX is greater than the second allowable amount of $NO_x$ adsorbed MAX II, the control flow moves to step 91, the air-fuel ratio in the combustion chamber 5 is temporarily changed to the rich range, and ΣNOX is cleared. At this time, $NO_x$ adsorbed in the $NO_x$ adsorption catalyst 22 is discharged from the $NO_x$ adsorption catalyst 22.

On the other hand, when it is determined in step 80 that the engine operation state is not in the high-load engine operation area III illustrated in FIG. 14, the control flow moves to step 92 and it is determined whether the current engine operation state currently transitions from the middle-load engine operation area II to the high-load engine operation area III. When it is determined that the current engine operation state currently transitions from the middle-load engine operation area II to the high-load engine operation area III, the control flow moves to step 93 and the air-fuel ratio in the combustion chamber 5 is temporarily changed to the rich range. On the other hand, when it is determined that the engine operation state transitions already from the middle-load engine operation area II to the high-load engine operation area III, the control flow moves to step 94. In step 94, the air-fuel ratio in the combustion chamber 5 is controlled to the theoretical air-fuel ratio in a feedback manner.

REFERENCE SIGNS LIST

5: combustion engine
6: ignition plug
11, 12: fuel injection valve
14: surge tank
19: exhaust manifold
20: three-way catalyst
22: $NO_x$ adsorption catalyst

The invention claimed is:

1. An exhaust gas control apparatus for an internal combustion engine, the internal combustion engine including an exhaust passage, the exhaust passage including a three-way catalyst and an $NO_x$ adsorption catalyst, the NOx adsorption catalyst configured to adsorb $NO_x$ in exhaust gas when an air-fuel ratio of the exhaust gas introduced to the NOx adsorption catalyst is in a lean range, and the NOx adsorption catalyst configured to discharge the adsorbed $NO_x$ when the air-fuel ratio of the exhaust gas introduced to the NOx adsorption catalyst is changed to a rich range, the exhaust gas control apparatus comprising:
an electronic control unit configured to control a combustion in a combustion chamber of the internal combustion engine at a first base air-fuel ratio when the internal combustion engine is operated in a predetermined low-load engine operation area, the first base air-fuel ratio being a lean air-fuel ratio;
the electronic control unit configured to change the combustion in the combustion chamber to the rich range air-fuel ratio during a first predetermined interval when the internal combustion engine is operated in the predetermined low-load engine operation area and the NOx adsorption catalyst discharges the adsorbed NOx,
wherein the electronic control unit is further configured to control the combustion in the combustion chamber to a theoretical air-fuel ratio in a feedback manner when the internal combustion engine is operated in a predetermined high-load engine operation area;
the electronic control unit configured to control the combustion in the combustion chamber at a second base air-fuel ratio when the internal combustion engine is operated in a predetermined middle-load engine operation area, the second base air-fuel ratio being lower than the first base air-fuel ratio, the predetermined middle-load engine operation area being set between the predetermined low-load engine operation area and the predetermined high-load engine operation area; and
the electronic control unit configured to change the combustion in the combustion chamber to the rich range air-fuel ratio during a second predetermined interval when the internal combustion engine is operated in the predetermined middle-load engine operation area and the NOx adsorption catalyst discharges the adsorbed NOx, the second predetermined interval being shorter than the first predetermined period.

2. The exhaust gas control apparatus according to claim 1, wherein
the electronic control unit is configured to calculate an amount of $NO_x$ adsorbed on the $NO_x$ adsorption catalyst, and the electronic control unit is further configured to change the combustion in the combustion chamber to the rich range air-fuel ratio when the internal combustion engine is operated in the middle-load engine operation area and the amount of $NO_x$ adsorbed is greater than a predetermined allowable amount of $NO_x$ adsorbed.

3. The exhaust gas control apparatus according to claim 1, wherein the electronic control unit is configured to calculate an amount of NOx adsorbed on the NOx adsorption catalyst, and the electronic control unit is configured to change the combustion in the combustion chamber to the rich range air-fuel ratio when the engine is operated in the low-load engine operation area and the amount of $NO_x$ adsorbed is greater than a predetermined first allowable amount of $NO_x$ adsorbed, the electronic control unit is further configured to change the combustion in the combustion chamber to the rich range air-fuel ratio when the engine is operated in the middle-load engine operation area and the amount of $NO_x$ adsorbed is greater than a predetermined second allowable amount of $NO_x$ adsorbed, and the predetermined second allowable amount of $NO_x$ adsorbed is less than the predetermined first allowable amount of $NO_x$ adsorbed.

4. The exhaust gas control apparatus according to claim 1, wherein the second base air-fuel ratio is an intermediate value between the first base air-fuel ratio and the theoretical air-fuel ratio.

5. The exhaust gas control apparatus according to claim 1, wherein a degree of richness of the air-fuel ratio when the air-fuel ratio in the combustion chamber in the middle-load engine operation area is in the rich range is less than the degree of richness of the air-fuel ratio when the air-fuel ratio in the combustion chamber in the low-load engine operation area is in the rich range.

6. The exhaust gas control apparatus according to claim 1, wherein the electronic control unit is further configured to temporarily change the air-fuel ratio in the combustion chamber to the rich range when an operation state of the internal combustion engine transitions from the low-load engine operation area to the middle-load engine operation area.

7. The exhaust gas control apparatus according to claim 1, wherein the electronic control unit is further configured to temporarily change the air-fuel ratio in the combustion chamber to the rich range when an operation state of the internal combustion engine transitions from the middle-load engine operation area to the high-load engine operation area.

8. The exhaust gas control apparatus according to claim 1, wherein a precious metal catalyst is supported on a catalyst carrier of the $NO_x$ adsorption catalyst, and a basic layer including at least one selected from alkali metal, alkali-earth metal, rare-earth metal, and metal that donates electrons to $NO_x$ is formed on the catalyst carrier.

9. The exhaust gas control apparatus according to claim 8, wherein the alkali metal is at least one selected from potassium K, sodium Na, and cesium Cs.

10. The exhaust gas control apparatus according to claim 8, wherein the alkali-earth metal is at least one selected from barium Ba and calcium Ca.

11. The exhaust gas control apparatus according to claim 8, wherein the rare-earth metal is lanthanoid.

12. The exhaust gas control apparatus according to claim 8, wherein the metal that donates electrons to NOx is at least one selected from silver Ag, copper Cu, iron Fe, and iridium Ir.

* * * * *